United States Patent Office 3,040,521
Patented June 26, 1962

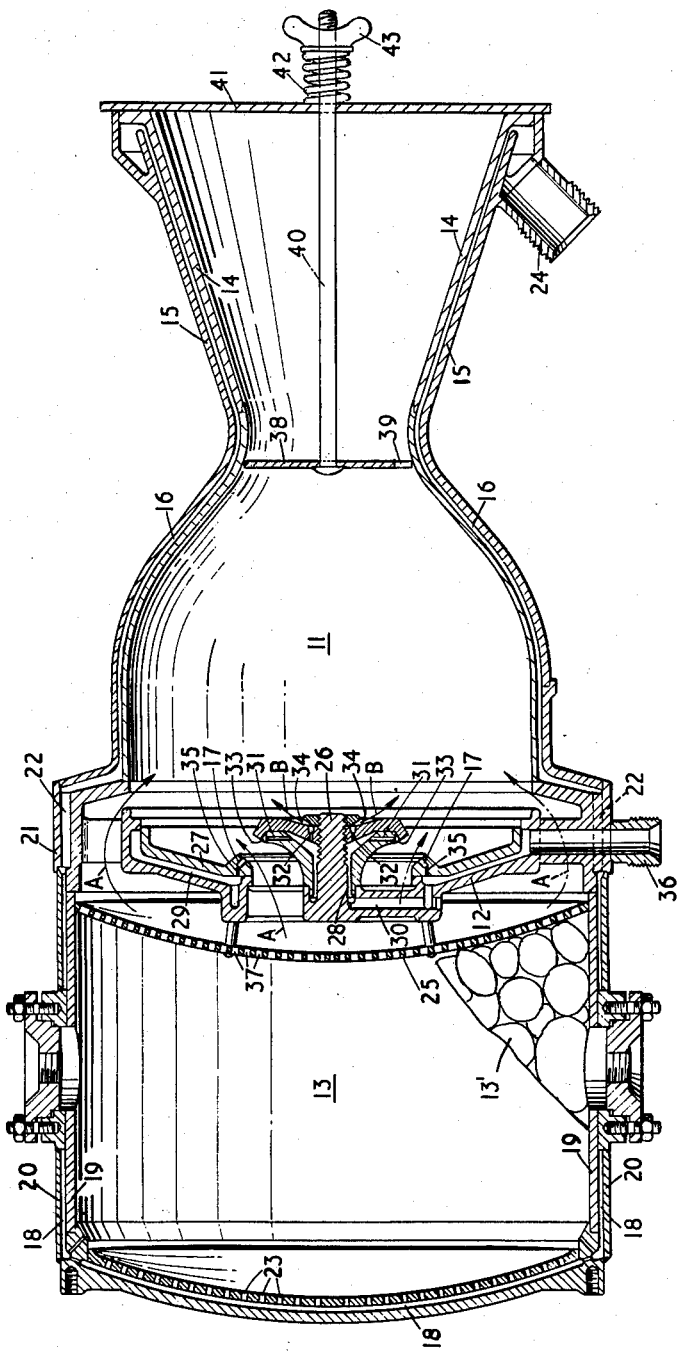

3,040,521
THERMAL IGNITION ROCKET MOTOR
Leslie William Broughton, and Heinz Alfons Walder, Aylesbury, England, assignors to the Minister of Supply, in Her Majesty's Government of the United Kingdom of Great Britain and Northern Ireland, London, England
Filed Mar. 30, 1955, Ser. No. 498,032
8 Claims. (Cl. 60—35.6)

This invention relates to rocket motors as used to propel aircraft or rockets and to afford a source of additional thrust which can be rendered operative when required e.g. for take off, to augment the thrust of the normal engine or engines of an aircraft.

Such rocket motors usually comprise essentially a combustion chamber to which is fed a mixture comprising a fuel and an oxidant, to produce by burning a rapid flow of gases from the chamber.

In one such motor, however, hydrogen peroxide is flowed under pressure through a catalyst at the intake end of the chamber and is thereby converted into steam and oxygen which issue from the outlet end of the chamber. Such motors are very safe in use as there is no burning or any production of a dangerous fuel-oxidant mixture. For this reason their use to assist take off in the case of jet engined civil aircraft has already been proposed, despite the fact that the specific thrust produced by these units is low compared with units in which a fuel, such as kerosene, is added to the steam and oxygen issuing from the catalyst and in which this mixture is fed to, and ignited at, the combustion chamber proper.

In a rocket motor, according to the invention, hydrogen peroxide is flowed under high pressure through a catalyst and the resultant superheated steam and oxygen issue into the combustion chamber in the same region of the latter as kerosene or a similar fuel is introduced into the chamber, under one conditions such that the fuel is ignited spontaneously by contact with the steam and oxygen.

Additionally, hydrogen peroxide may be introduced in liquid form into the combustion chamber.

To effect ignition the temperature of the steam and oxygen entering the chamber must be above a certain critical value depending upon the quantity of steam flowing and the size of combustion chamber. Whilst normally this critical value of temperature will be exceeded it may be that in certain applications the quantity of steam flowing and/or the size of combustion chamber will be such that the critical temperature is not reached so that it is then desirable to provide some means of increasing the temperature inside the combustion chamber. For this purpose the combustion chamber outlet may be effectively restricted initially, so that a sufficiently high initial pressure and therefore temperature to effect ignition is produced. The pressure developed subsequent to ignition may be conveniently used to remove the restriction, the steam and oxygen thereafter enter the chamber at a temperature and pressure appropriate for normal running.

One form of power unit in accordance with the invention employing steam and oxygen generated by flowing hydrogen peroxide through a catalyst, and kerosene, is illustrated by the accompanying sectional drawing.

The power unit comprises essentially a combustion chamber 11, a spray or feed unit 12 and a catalyst chamber 13, all of circular cross section. The catalyst is contained in the catalyst chamber in the known form of pellets 13', and may be any one of several conventional catalysts such as silver, copper or treated ceramics. No claim is made herein to any specific catalyst or structure therefor. The combustion chamber 11, which is in the form of a venturi nozzle, is formed with a double wall 14, 15 the space 16 within which communicates with similar spaces 18 within double walls 19, 20 of the catalyst chamber 13 via an annular series of passages two of which are shown at 22, 22 through the wall 21 surrounding the spray or feed units 12. The space 18 communicates with the interior of the catalyst chamber 13 through a series of orifices 23. The spray unit 12 comprises a central composite hub portion 26 and a composite outer portion 27 which portions are formed with internal annular passages 28 and 29, respectively. which in turn are interconnected by means of two radial passages which are shown at 30. The annular passage 28 communicates through radial passages 31 and axial passages 32 with two annular slits 33 and 34, respectively, between adjacent portions of the hub 26. The passage 29 communicates with an annular slit 17 in one part of the outer portion 27 through axial passages 35 in the latter and also with an inlet port 36.

In operation, hydrogen peroxide is fed under pressure through an inlet port 24 at the outer end of the combustion chamber 11 and, acting as a coolant, passes through the space 16 and via the ports 22 and space 18 into the catalyst chamber 13 via the orifices 23. From the resultant catalytic action steam and oxygen at high temperature and pressure are produced and pass via orifices 37 in the inner end dividing wall 25 between the spray unit 12 and the catalyst chamber 13 into the spray unit 12.

At the same time kerosene is fed under pressure through an inlet port 36 at the circumferential part of the wall of the spray unit 12 and into the passages 28 and 29, thence to the annular slits 17, 33 and 34 from which it issues in the form of a fine spray into the inner end region of the combustion chamber 11. The steam and oxygen after entering the spray unit 12 via the orifices 37 pass between the hub portion 26 and the outer portion 27, on the one hand, and between the outer portion 27 and the wall 21, on the other hand, into the inner end region of the combustion chamber 11 as indicated by the arrows A. The mixture of oxygen and steam entering at A and the kerosene spray from the slits 17, 33 and 34 impinge upon each other at the inner end region of the combustion chamber 11 where the latter is ignited by the former.

If the chamber size or steam quantity flowing are such that the critical temperature and/or pressure conditions are not reached in the arrangement so far described then the use of the additional parts described below will result in an increase in the pressure sufficiently high to achieve ignition.

In this case the necessary high pressure is achieved with a steam generator (catalyst chamber) 13 appropriate for normal running, by means of a temporary initial obstruction of the venturi shaped outlet of the combustion chamber 11 in the form of a baffle plate 38 indicated by broken lines which is cut away at a number of places around its periphery one of which is indicated at 39. The transverse dimensions of this plate 38 are greater than the minimum internal dimensions of the venturi neck of the combustion chamber 11 and the plate 38 is held in position by a bolt 40 extending through it and through a cross bar 41 held against the outer end of the combustion chamber 11 by a spring 42 and a wing nut 43 threaded onto the outer end of the bolt 40. On starting up, the outlet from the combustion chamber 11 is greatly reduced by the plate 38 and as a result the steam and oxygen entering the chamber reach a high enough pressure to produce a temperature sufficient to ignite the kerosene impinging thereon, whereupon the consequent sudden further increase of pressure distorts the baffle plate 38 and forcibly removes it together with the bolt 40 and cross bar 41, after which normal running is established automatically.

We claim:

1. A jet reaction rocket motor having a combustion chamber, means connected to the combustion chamber for introducing a pressure combustible fuel mixture into said chamber, said combustion chamber having a discharge nozzle, obstructing means positioned within said discharge nozzle for creating a pressure sufficient to ignite said pressure combustible fuel mixture, said obstructing means being mounted for removal by pressure from within the combustion chamber.

2. A jet reaction rocket motor having a combustion chamber, means connected to said combustion chamber for introducing a pressure combustible propellant mixture comprising fuel and an oxidant into said chamber, said combustion chamber having a discharge nozzle, closing means positioned within said discharge nozzle for creating a pressure within said combustion chamber sufficient to ignite said pressure combustible mixture, means for securing the closing means in position in said discharge nozzle, said closing means and means for securing same being mounted for removal by the pressure resulting from the combustion of said propellant mixture.

3. The combination of claim 2 further defined in that the nozzle closing means comprises means which is distortable under pressure generated from within the combustion chamber.

4. The combination of claim 2 further defined in that the nozzle closing means comprises a surface of projected area greater than the nozzle outlet, and having a distortable portion for causing said surface to yield and be forcibly ejected from the combustion chamber by pressure from within said combustion chamber.

5. A jet reaction motor as set forth in claim 2 wherein said securing means includes a supporting bolt extending rearward from and outside of said combustion chamber, and means extending across the discharge end of said combustion chamber for supporting said bolt.

6. A jet reaction rocket motor having a combustion chamber, a catalyst positioned in a catalyst chamber contiguous to said combustion chamber for converting an oxidant into superheated steam and oxygen, means for passing an oxidant through said catalyst, means interconnecting said combustion chamber and catalyst chamber for introducing said superheated steam and oxygen into said combustion chamber from said catalyst chamber, fuel injecting means connected to said combustion chamber for introducing liquid fuel to said combustion chamber, said combustion chamber having a discharge nozzle, temporary obstructing means positioned within said discharge nozzle for obstructing the nozzle outlet so as to cause ignition of said fuel, said obstructing means being mounted for complete removal by pressure from within the combustion chamber only after ignition.

7. A method of igniting a pressure combustible propellant fuel mixed with an oxidant which comprises the steps of flowing said oxidant and propellant fuel under pressure into a combustion chamber having a discharge nozzle, increasing said pressure to ignite said pressure combustible fuel by substantially obstructing the discharge nozzle of said combustion chamber, and forcibly moving the obstruction from said discharge nozzle by pressure from the ignited propellant so that products of combustion may be discharged from the combustion chamber during operation.

8. The method set forth in claim 7 further comprising the steps of preheating said oxidant by flowing it through annular passages surrounding the combustion chamber and converting it into steam and oxygen by a catalyst prior to mixing with said propellant fuel.

References Cited in the file of this patent

UNITED STATES PATENTS

| | | |
|---|---|---|
| 927,434 | Shonnard et al. | July 6, 1909 |
| 2,494,562 | Kessenich | Jan. 17, 1950 |
| 2,607,160 | MacDonald | Feb. 3, 1953 |
| 2,700,337 | Cumming | Jan. 25, 1955 |
| 2,746,249 | Bichowsky | May 22, 1956 |
| 2,776,623 | Bonner | Jan. 8, 1957 |
| 2,791,883 | Moore et al. | May 14, 1937 |
| 2,949,007 | Aldrich et al. | Aug. 16, 1960 |

FOREIGN PATENTS

| | | |
|---|---|---|
| 680,718 | Great Britain | Oct. 8, 1952 |